(12) United States Patent
Beloussov et al.

(10) Patent No.: US 8,074,276 B1
(45) Date of Patent: Dec. 6, 2011

(54) METHOD AND SYSTEM FOR ADMINISTRATION OF SECURITY SERVICES WITHIN A VIRTUAL EXECUTION ENVIRONMENT (VEE) INFRASTRUCTURE

(75) Inventors: Serguei M. Beloussov, Singapore (SG); Stanislav S. Protassov, Moscow (RU); Alexander G. Tormasov, Moscow (RU)

(73) Assignee: Parallels Holdings, Ltd., Tortola (VG)

( * ) Notice: Subject to any disclaimer, the term of this patent is extended or adjusted under 35 U.S.C. 154(b) by 1418 days.

(21) Appl. No.: 11/556,233

(22) Filed: Nov. 3, 2006

Related U.S. Application Data

(63) Continuation-in-part of application No. 10/826,280, filed on Apr. 19, 2004, now Pat. No. 7,698,400.

(51) Int. Cl.
*G06F 11/30* (2006.01)
*G06F 12/14* (2006.01)
*G06F 9/455* (2006.01)

(52) U.S. Cl. .................. 726/22; 718/1; 726/23; 726/24; 726/28; 726/29; 713/188

(58) Field of Classification Search .................... 726/24, 726/22, 23, 25, 1, 11, 27–29; 713/187, 188; 718/1
See application file for complete search history.

(56) References Cited

U.S. PATENT DOCUMENTS

| 7,188,369 | B2 * | 3/2007 | Ho et al. .......................... 726/24 |
| 7,409,719 | B2 * | 8/2008 | Armstrong et al. .............. 726/24 |
| 7,496,961 | B2 * | 2/2009 | Zimmer et al. .................. 726/23 |
| 7,797,748 | B2 * | 9/2010 | Zheng et al. ..................... 726/24 |
| 2005/0216759 | A1 * | 9/2005 | Rothman et al. ............... 713/200 |
| 2007/0094367 | A1 * | 4/2007 | Esfahany et al. .............. 709/223 |

FOREIGN PATENT DOCUMENTS
EP    2154626 A2 *   2/2010

* cited by examiner

*Primary Examiner* — Zachary A Davis
(74) *Attorney, Agent, or Firm* — Bardmesser Law Group

(57) ABSTRACT

A system and method for managing administration of security services provided to users includes a computer system and an operating system running on the computer system. A plurality of Virtual Execution Environments (VEEs) are executed on the computer system. The VEEs can be any of a Virtual Private Server, a Virtual Machine, a Hypervisor-based Virtual Machine, and a Lightweight Hypervisor-based Virtual Machine, a session of Terminal Server and a session of Presentation Server, Lightweight Hypervisor-based Virtual Machines, VMM-based VMs or hypervisor-based VMs. Each VEE provides a set of services to remote users. One or more designated VEE(s) provide security services to each of the VEEs based on the needs of the remote users of the particular VEEs. The security services provided by the designated VEE can be firewall services, spam filtering and anti-virus protection. The security services are controlled and administered by each of the VEEs requesting a particular service via control means of the designated VEE(s).

20 Claims, 14 Drawing Sheets

METHOD AND SYSTEM FOR ADMINISTRATION OF SECURITY SERVICES WITHIN A VIRTUAL EXECUTION ENVIRONMENT (VEE) INFRASTRUCTURE

CROSS-REFERENCE TO RELATED APPLICATIONS

This application is a continuation-in part of U.S. patent application Ser. No. 10/826,280, filed on Apr. 19, 2004 now U.S. Pat. No. 7,698,400, entitled DEDICATION OF ADMINISTRATIVE SERVERS TO MANAGEMENT OF SERVER FUNCTIONS IN A MULTI-SERVER ENVIRONMENT, which is incorporated by reference herein in its entirety.

BACKGROUND OF THE INVENTION

1. Field of the Invention

The present invention relates to management of security services within a virtual execution environment (VEE), and more particularly, to dedication of one or more VEEs for administration and management of security services for remote users.

2. Background Art

Security services for computer systems are typically implemented by firewalls located on the edge of a LAN. The same set of security services is provided for all of the computer systems "behind" the firewall. Another typical implementation of security services is to have a security application such as anti-virus or spam filtering executed on each of the computer systems.

Computer systems, such as those that run server processes, typically have a set of services (sometimes called "daemons") that are used for servicing user requests and operating system requests. These services can be dedicated to servicing requests from external anonymous users, for example, a WWW service or an anonymous FTP service. They can also be used for servicing requests from authorized users, such as FTP service and email service POP3/IMAP4 (Post Office Protocol 3/Internet Message Access Protocol (version 4)).

Such services are typically launched as one or more operating system processes/threads and "live" within operating system space, which includes within it a common object name space. Examples of such types of objects with operating system-wide names or identifiers include process identification (PID), file names, named pipes, TCP port IDs, etc. Each service, upon request and when available, receives appropriate resources from the operating system, which it then uses to service user requests.

For management (administration) of these services, typically a system administrator, who can enter appropriate operating system commands, and who can monitor the state of the operating system and the services, is required. A particular case of a system administrator is an operator, who is typically allowed only a highly restricted subset of functions—for example, checking server statistics, management of print queues, etc.

The cost of a system administrator for the owner of such a system (e.g., a data center) is often a substantial part of the total cost of ownership (TCO). Easing the burden on such a system operator and enabling a substantial commonality of his activities is an important issue in software development for data center administration.

The job of an administrator, as it relates to administrative services, often includes not just direct commands to the computer system for performance of specific actions, but also involves certain "indirect" operations. Examples of such indirect operations include assurance of an appropriate level of security, verification of system state, backing up data and creation of backup databases, provision of new servers and services, load balancing, etc. Attempts to ease the burden on the operator for providing such functions take several forms. For example, the use of Virtual Private Servers (VPSs) allows at least some commonality among the various server processes running within the computer system, and also allows commonality in their instantiation and configuration. Usually VPSs are installed with mass administration tools, for example, VIRTUOZZO VPS (available from SWSOFT Inc., www.SWSOFT.com) has a set of special scripts, command line and Graphical User Interface utilities for such a purpose.

The problem of administration of a large set of services and servers for many users is widely known, especially to administrators of web hosting companies and data centers. Each routine operation often requires expensive manual operations, and, when handling thousands of users even on a single hardware box with a single operating system, each simple operation, which should be performed hundreds and thousands of times, becomes very expensive. Unification and simplification of mass operations therefore can result in a significant economical benefit.

Another ever-present problem is assuring a level of safety and security of the services provided to the users. For example, authentication of users and user login verification has to occur within a safe environment. Any failures and crashes of services for one user should not affect services for other users, and should not affect overall system security.

Another approach is sometimes referred to as Embedded IT solution technology (http:**www.intel.com/technology/itj/2006/v10i3/4-models/10-authors.htm), enabled through the use of Intel Virtualization Technology (VT) or software emulation mode to implement VM support. It performs client isolation and uses a Recovery (CIR) usage model that emphasizes isolating manageability and security services in a virtual manageability appliance. IT departments thus benefit from the ability to isolate key services from end-user access.

The concept of a so-called "sandbox" is one conventional solution. For example, in the UNIX environment, it is common to place the FTP services for anonymous users within a "sand box." In that case, even if an intruder manages to gain access to that particular server and "breaks it," then his malicious activities still occur within the sand box (a secure environment), and the intruder cannot gain access to any critical system data in this fashion.

Additionally, there may be issues with execution of non-standard operations. One type of such non-standard operations is "dangerous" operations that can result in an unpredictable state of the system. Examples include remote services reboot and remote firewall configuration operation. In the case of remote services reboot, should that process fail to reboot and reinitialize the appropriate server process properly, the only recourse available to an administrator of that particular process (for example, to a remote VPS administrator) is to request expensive manual intervention from the system administrator. In the case of remote firewall configuration, the person configuring the firewall could accidentally mis-configure it in such a manner that even the administrator or operator of such a firewall is himself blocked from any further access through the firewall. This results in a server process or a VPS, that is "empty," i.e., running "normally," but is in reality useless, because it is inaccessible.

Other non-standard operations include organization of services providing name-based hosting for web users, where a number of virtual web servers share the same IP address with a single logical instance of the webserver. Other services include security services.

Accordingly, what is needed is a system and method for providing a more secure and more reliable mechanism for managing administration of security services in a multi-server environment, as well as a way to simplify mass management of security implementations.

SUMMARY OF THE INVENTION

The present invention relates to management of security services within a Virtual Execution Environment (VEE), and more particularly, to dedication of one or more VEEs for administration and management of security services for remote users, that substantially obviates one or more of the disadvantages of the related art.

More particularly, a system, method and computer program product for management of security services within a virtual execution environment (VEE) provided to users include a computer system and an operating system running on the computer system. A plurality of Virtual Execution Environments (VEEs) is executed on the computer system or on a plurality of remote computer systems. VEE can be any of a Virtual Private Server, a Virtual Machine, a Hypervisor-based Virtual Machine, and a Lightweight Hypervisor-based Virtual Machine, a session of Terminal Server WINDOWS 2003 (or older) and a session of Citrix Presentation Server, Lightweight Hypervisor-based Virtual Machines, VMM-based VMs or hypervisor-based VMs. Each VEE provides a set of services to remote users. A designated VEE provides security services to each of the VEEs based on the needs of the remote users of the particular VEEs. The security services provided by the designated VEE can be firewall services, spam filtering and anti-virus protection. The security services are controlled through the designated VEE by each of the VEEs requesting a particular service.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VPS—Virtual Private Server, is one type of a Virtual Execution Environment (VEE) running on the same hardware system with a shared OS kernel and most of the system resources, where isolation of Virtual Execution Environments is implemented on the namespace level. A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—Virtual Machine, a type of isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—control software having the highest privilege level for administrating hardware computer resources and Virtual Machines.

Figure 1:
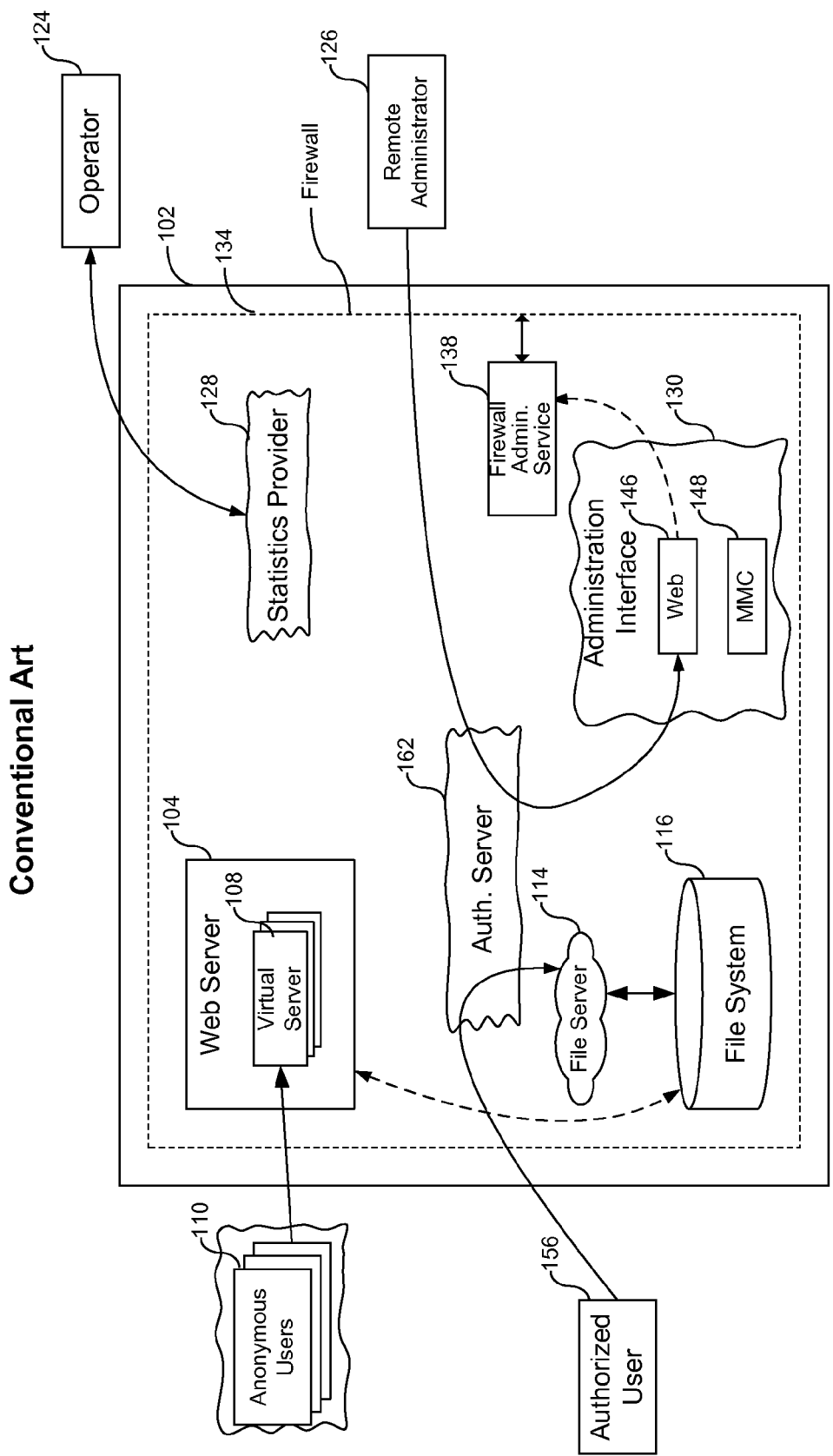
FIG. 1 illustrates a generic computer system with a built-in firewall.

FIG. 1 illustrates a generic computer system 102 with an optional built-in firewall 134. If the firewall 134 is present, all contact with external entities occurs through the firewall 134. The computer system 102 may have a server process running, such as a webserver 104 (or a number of such webservers 104). The webserver 104 may have a number of virtual servers 108 running within it. The virtual servers 108 may interface to anonymous external users 110. Here, anonymous users 110 are, or example, users accessing a web page on the virtual server 108 by clicking on a link in their browser (in other words, without mandatory registration or a log-in of any kind as a user of the system 102).

The computer system 102 also may include some form of a statistics provider 128, which may be accessible by an operator 124. The statistics provider 128 is normally used to gather resource usage and other performance/utilization statistics for the various processes/services that run within the computer system 102.

An authorization server 162 is used to authorize users 156 and remote administrators 126. The authorization server 162 can be used by a file server 114, which interfaces with a file system 116. An example of an authorized user 156 is a user that needs to download certain files from the file system 116 using an FTP protocol.

The computer system 102 also includes the administration interface 130, which is used by the remote administrator 126 to manage the operations of, for example, the authorization server 162 or the firewall 134. The administration interface may include, for example, a web interface 146 of the administrative system. It may also include a MICROSOFT Management Console (MMC) 148 or other interfaces. These interfaces 146, 148 enable the remote administrator 126 to manage appropriate computer services. Example of such a service is a firewall administrative service 138 that manages the settings of the firewall 134, and may be controlled by the remote administrator 126 through the administration interface 130.

Note that the operator 124 is often a person whose job it is to continually monitor the state of the computer system 102 (or a number of such computer systems).

Figure 2:
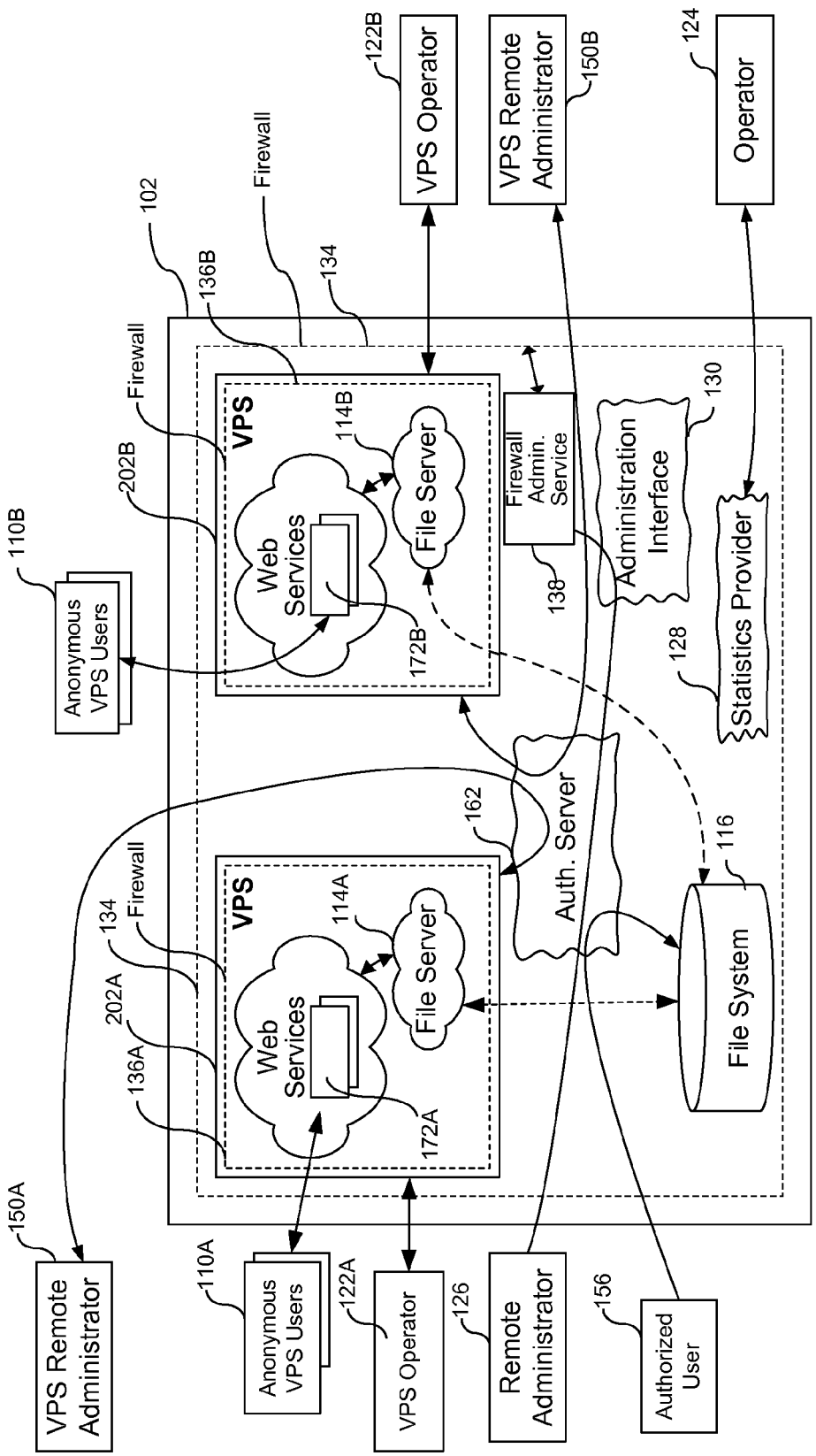
FIG. 2 illustrates a variation on FIG. 1 in the context of Virtual Private Servers (VPSs).

FIG. 2 illustrates a variation on FIG. 1, particularly in the context of Virtual Private Servers, examples of which are also described in co-pending commonly assigned U.S. patent application Ser. No. 10/703,594, filed on Nov. 10, 2003, entitled VIRTUAL PRIVATE SERVER WITH ISOLATION OF SYSTEM COMPONENTS, which is incorporated by reference herein in its entirety. In FIG. 2, the webserver 104 of FIG. 1 has been replaced by a number of server processes, such as Virtual Private Servers (VPSs) 202A, 202B, etc. Each such Virtual Private Server 202 has its own corresponding remote administrator 150A, 150B, which are typically authorized through the authorization server 162 (or can use their own authorization service). Each VPS 202A, 202B has corresponding anonymous VPS users 110A, 110B, which access web services 172A, 172B through optional firewalls 136A, 136B of each individual VPS 202A, 202B. Each VPS 202A, 202B optionally can have its own file server 114A, 114B, which interfaces to the file system 116 and to respective web services 172A, 172B of the VPSs 202A, 202B. Each VPS 202A, 202B is operated by its corresponding VPS operator 122A, 122B (if any).

Figure 3:
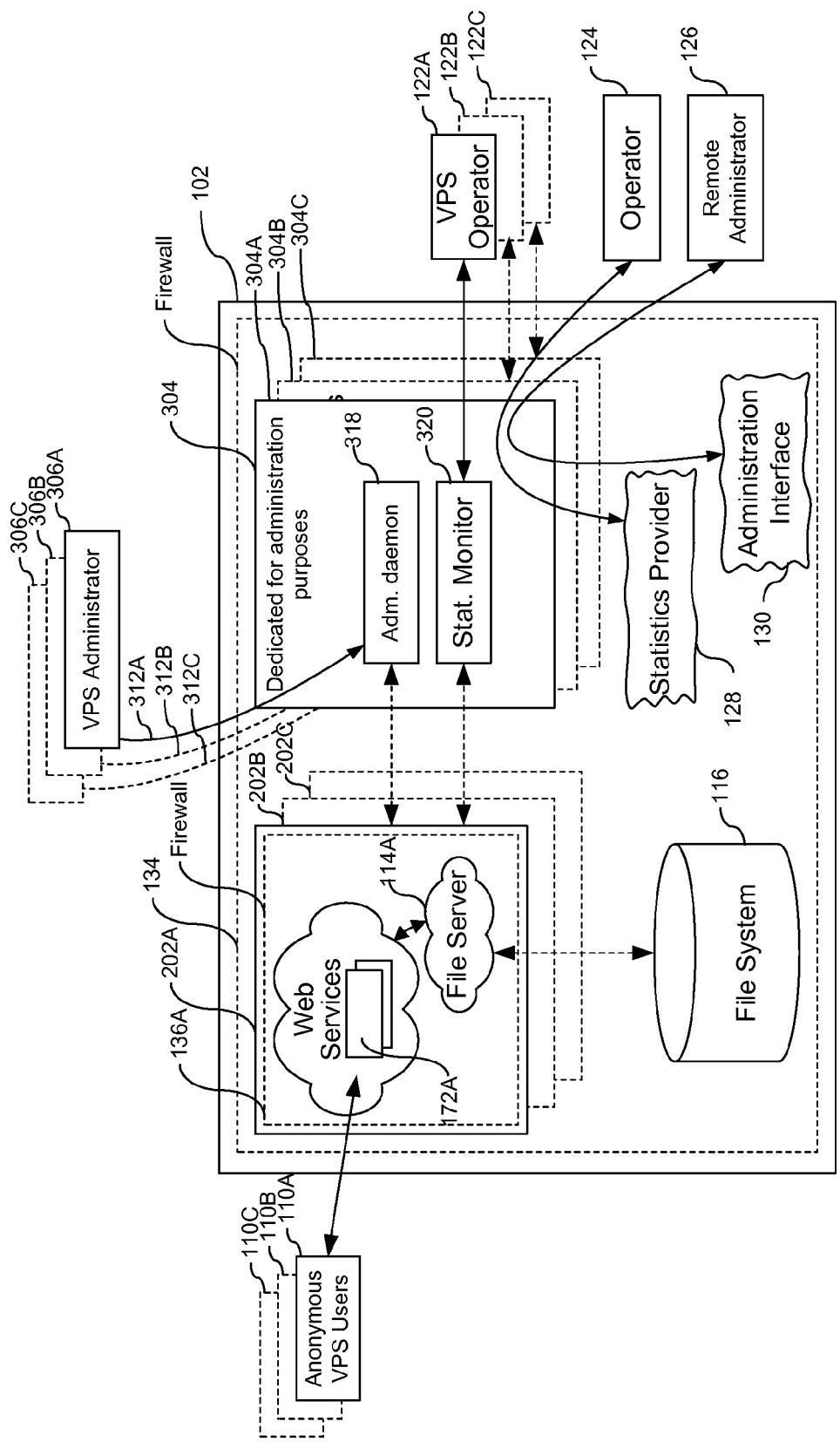
FIG. 3 illustrates an embodiment where one VPS has been dedicated for administrative purposes.

With reference to FIG. 3, each VPS administrator 306A, 306B, 306C (generically referred to as "administrator 306") does not need to be connected directly to its own VPS 202. Rather, the VPS administrator 306 can be connected to a service VPS 304, or a number of VPS administrators 306A, 306B, 306C, etc. can be connected to corresponding VPSs 202A, 202B etc. via the service VPS 304. Each computer system can have one or more sets VPSs that are similar in implementation technology, with one or more of them being dedicated to administration purposes. Similarity may include a common way of numbering (or identifier creation for each VPS) and common implementation technology (e.g., VM-like, separation of namespaces as in VIRTUOZZO, chroot/jail environments, logical grouping, etc.).

A VPS illustrated in FIG. 2 (for example, 202A) is an example of a server process, or group of services. Such a group of services may be, for example, web services 172A with or without other services. They may also be, for example, a file server, an FTP server, an authentication server, a chroot environment, a jail environment, a sand box environment (all discussed below), a print server or a MICROSOFT WINDOWS Terminal Service. Other examples of a server process include POP3 servers, IMAP/IMAP4 servers, SMTP (Simple Mail Transfer Protocol) servers, web servers, resources scheduler servers, COM/COM+/DCOM (Component Object Model/extended COM/Distributed COM) servers, cryptographic servers, browser servers, DHCP (Dynamic Host Configuration Protocol) servers, Distributed file system servers, Distributed Link tracking servers, event log servers, reporting servers, DNS (domain name systems), file replicator servers, SSL (Secure Socket Layer) servers, indexing servers, firewall servers, Kerberos servers, IPSEC servers (IPSEC is a protocol suite used for secure communication at a network layer between two peers), instant messaging servers, message write (messenger) servers, logon servers, Network DDE (Dynamic Data Exchange) servers, NLA (Network Location Awareness) servers, performance logs and alerts servers, plug and play servers, print spooler servers, protected storage servers, disk encryption servers, routing servers, remote access servers, security account manager servers, system event notification servers, telnet servers, telephony servers, uninterruptible power supply servers, virtual disk servers, WINDOWS installer servers, WINDOWS Management Instrumentation (WMI) wireless configuration servers, WMI performance adaptor servers, data base servers, Network address translation servers, IRC (Internet Relay Chat) servers, chat servers, X windows servers, inetd servers, volume shadow copy servers, boot and remote boot servers, finger servers, secure shell (SSH) servers, who servers, rexec servers, webster servers, conference servers, Radius™ servers, zip servers, socks servers, afbackup servers, backup servers, ASP (Active Server Pages) servers, fido servers, WAP (Wireless Application Protocol) servers Plesk server™ (available from SWSOFT, Inc.), VIRTUOZZO servers (available from SWSOFT, Inc.), VIRTUOZZO for WINDOWS servers (available from SWSOFT, Inc.), wireless access servers, wireless routers and wireless access points, WINDOWS workstation server, NET BIOS servers, NET BEUI servers, and various TCP/IP servers.

In this discussion, a VPS is understood to be a set of services with an identifier that is unique in some context. There are ways to distinguish one VPS from another, which are referred to as "isolation." The VPSs can be different in nature, and their isolation can also be different, depending on the technical implementation. Some VPS can be implemented in form of "Virtual Machine" or computer hardware emulators (for example, MICROSOFT Virtual PC or VMware virtual machine, User Mode Linux, WINDOWS Application Binary Interface (WABI)). This is typically a user-level process or set of processes running inside a normal standard operating system (such as Linux, MICROSOFT WINDOWS, other UNIX implementations, and so on) that emulate inside virtual machine some computer hardware (such as a disk, CPU, peripheral devices, etc). From the user's point of view, this emulation provides a "virtual computer hardware" in which he can perform the same operations that he can perform on a typical stand-alone workstation, server or notebook computer. For example, the user can install and run inside the "virtual machine" (VM) a separate (his own copy) operating system, including an OS kernel and a set of user mode processes. Technically, implementation of such a "VM" can use architecture-specific features of the platform, or can be implemented cleanly inside user-mode applications. VMware VM is implemented using a so called "monitor" that uses support from the x86 architecture to effectively process virtual memory operations inside the emulator.

Another way to implement a VPS is to separate a set of processes in a single OS kernel. Each VPS can be declared to have a set of OS processes, kernel structures, etc. Depending on the particular implementation, this approach can involve different levels of isolation—starting from hard resources isolation with guarantees, separate disk space, etc up to a virtual absence of resource isolation.

VPS isolation can include, for example, logical isolation of processes, physical isolation of processes, resources isolation, namespace isolation, data isolation, address isolation, fault isolation and performance isolation (partial or full).

Isolation of processes refers to processes that are running in the same OS kernel, but are separated by means of OS or user space processes. Physical isolation of processes means that processes are running in different media (for example, in native OS and inside the virtual machine discussed above). Resource isolation means that resources used inside one VPS are not available in another VPS (for example, dedicated disk areas, VM emulators, dedicated CPU, etc.). Namespace isolation refers to the case where names used in one VPS can be used inside another VPS—for example, they can have same names of OS named objects, same user names and so on—but objects with the same names will be different in different VPSs. Data isolation refers to the case where data used in one VPS is isolated and cannot be used in another VPS. For example, each VPS can have its own private set of files for webserver services.

Address isolation refers to each VPS having its own isolated addresses that cannot be used inside another VPS. For example, the VPSs can have different IP addresses, different DNS names or processes with different OS Process Identifiers (PIDs).

Fault isolation refers to isolation of faulted application, i.e., if the application fails in one VPS, another VPS will be not affected.

Performance isolation is where behavior of one VPS (or of processes inside one VPS) will not influence the performance of another VPS if the user requests for service fall within bounds of a specified service level agreement (SLA).

Physical hardware isolation is used to configure single computer hardware so that it appears to be split into a set of semi-independent computers. The examples of this are the schemes previously used by SUN MICROSYSTEMS, Inc. for domain partitioning, as well as "blade" servers set, etc.

Logical hardware isolation is used to logically reconfigure a single hardware unit to a set of semi-independent computers. An example of this is IBM LPAR (logical partitioning).

Examples of VPS implementation technologies include SWSOFT VIRTUOZZO technology, MICROSOFT WINDOWS Terminal Services, FreeBSD jail and UNIX chroot environments.

The most straightforward implementation can include only nominal "logical" isolation, when only the user knows which processes belong to which VPS, without special support in OS kernel and even without support in user-mode applications. In such an implementation, the term VPS can still be used, because typically users can treat this group of services as a logically indivisible entity. This can also include so-called "virtual servers" of a webserver that share single instances of Apache server and use an IP address and/or DNS name for services separation. SWSOFT PLESK servers use separate webservers for normal users and for administrators. This allows treating both of them as two VPSs, with one of them dedicated to administration purposes.

With the above discussion in mind, each group of services may be optionally protected by its own firewall (here, 136A, 136B). It may have its own file server (here, 114A, 114B). The services provided by the group of services, or by the VPS 202A, are grouped together in some logical manner from a user's or operating system's perspective. Each VPS 202A may optionally have its own webserver (for example, 104 of FIG. 1). The administration interface 130 may be dedicated to managing this particular group of services (202A), and/or several groups of services, and/or the entire computer system 102.

FIG. 3 illustrates an embodiment of the present invention where one of the groups of services (for example, a "service VPS," an "isolated VPS" or an "administrative server") has been dedicated to administrative purposes, and is labeled 304 in FIG. 3. For simplicity, element 304 will be referred to in the text below as a "service VPS," although it is understood that it need not always be a VPS, but rather is a logical dedicated grouping of certain administrative and/or other processes/functions that relate to the management of the VPSs 202A, 202B, 202C, etc. (generically referred to as "VPS 202"), and/or the management functions of the computer system 102 and its operating system.

A set of groups 304 can also be used for such administrative purposes. The term "administrative" is used in a broader sense than its typical usage, and includes additional functions that extend beyond normal administrative functions, such as, for example, responding to user requests and multiplexing of VPSs 202A, 202B, 202C. Administrative functions may also be thought of as operations that are not intended to serve end users, but are auxiliary in nature, such as backup/restore data, or which can be used to provide some enhancements (e.g., performance, scalability, etc.) for computer system itself. Other examples of administrative operations include installation/removal of OS components and user applications, configuring of OS components and user applications, configuring networking hardware and firewalls, computer hardware, and wireless hardware, servicing of VPS migration requests, servicing of processes migration requests, and servicing of requests for computer system resources. Servicing of requests of migration processes from one computer to another one can be done offline (when the process is stopped before migration and is later restored) and online (when the process is migrated transparently to users and other processes).

The service VPS 304A can have its own VPS operator 122, its own administrator 306, and interfaces directly to the statistics provider 128 and the administration interface 130, as shown in FIG. 3. In other words, the service VPS 304A can be conceptually similar to the VPS 202A in the sense of being a server process, but serves different functions.

For example, the VPS 304A can have an administrative daemon 318, which communicates with the VPS 202A for management purposes. Also, a statistics monitor 320 can interface to the VPS 202A, for collection of statistics relating to, for example, resource utilization by the VPS 202A. The statistics monitor can interface to the VPS operators 122A, 122B, 122C, etc. (generically referred to as "operator 122").

Note that in FIG. 3, the arrows (communications lines) linking the operator 124 to the statistics provider 128, and the arrow linking the VPS remote administrator 126 to the administration interface 130, go through the VPS 304A, although that need not always be the case, and the communication may be direct.

Thus, the VPS 304A is referred to as a "service VPS," an "administrative server," or as a "service environment," since the primary purpose of these VPSs 304A-304C is not servicing end users, but servicing administrative functions (in the broad sense discussed above). Examples of services that may be handled by the service VPS 304A include, for example, the following:

(1) management of chroot environment (a UNIX concept that gives a user an appearance that some private directory is a root directory);

(2) management of a jail environment (a FreeBSD concept) and a sand box environment, both of which refer to creation of a secure environment within a server, where process failure or crash does not affect the rest of the computer system 102;

(3) management of a session of WINDOWS Terminal Service;

(4) management of instances of Virtual Private Servers;

(5) management of Virtuozzo™ Virtual Private Server and Virtuozzo™ Virtual Environment, marketed by SWSOFT, Inc.;

(6) management of PLESK servers, marketed by SWSOFT, Inc.; and (7) Other examples include data backup and restore operations, updates installation (OS and applications), checking permissions for operations, security-related analysis and operations, audit of operations, application installation and configuration, network and other OS and application parameters configuration, driver installation and upgrade, spam filter operations, firewall installation and configuration, creation/deletion of users creation/deletion of groups, license-related management, remote access management, certificates management and data updates.

With reference to FIG. 3, each VPS administrator 306A-306C does not need to be connected directly to its own VPS 202A, 202B, 202C. Rather, the VPS administrator can be connected to a service VPS 304A, or a number of VPS administrators 306A, 306B, 306C, etc. can be connected to corresponding VPSs 202A, 202B, 202C via the service VPS 304A.

Note also that there may be a number of such service VPSs 304A-304C, each one dedicated to a particular service. Thus, one such administrative server 304A may be dedicated to handling web page requests, another (304B) may be dedicated to handling authorization of administrators of the VPSs 202A, 202B, 202C, another one may be dedicated to handling network traffic management, another one might only handle email, another one might only handle FTP requests, etc. It will be appreciated that in this case, there will not necessarily be a one-to-one correspondence between operators 122A-122C and service VPSs 304A-304C. Generally, there also will not be a one-to-one correspondence between a VPS 202A, 202B, 202C and a service VPS 304A; in other words, normally, one service VPS 304 will interface to a number of VPSs 202A, 202B, 202C. Alternatively, a single service VPS 304A can handle all of the administrative requests for all of the servers 202A, 202B, 202C (generically, "server 202").

In FIG. 3, 312 designates a request or command from the VPS administrator 306A, 306B, 306C to its corresponding VPS, which is intercepted by the service VPS 304A. Note that the existence of the service VPS 304A is usually transparent to all of the users 110A-C, administrators 306A, 306B, 306C, and authorized users 156.

In FIG. 3, the VPS operators 122A, 122B, 122C, etc. can monitor the performance and the statistics of the particular VPS through the service VPS 304A.

The service VPS 304 can perform any, or all, or some subset, of the following exemplary functions:

1) response to requests for statistics and performance parameters and the performance counters of a particular VPS 202A-C;

2) response to requests for administration of the operating system and its services and daemons;

3) response to requests for administration of the processes running within the computer system 102 (such as VPSs 202A-C, webservers 104, virtual servers 108, statistics provider 128, etc.);

4) response to requests for allocation or reallocation of resources of the computer system 102;

5) response to requests for authorization within the operating system of the computer system 102;

6) response to authorization within itself (i.e., within the service VPS 304A);

7) response to requests for authorization within VPSs 202A-C and similar processes that require authorization;

8) response to other operations that may potentially be non-executable within either the service VPS 304A or the VPSs 202A-C;

9) response to requests for operation, where the requests could lead to a process failure or a crash within a VPS 202A-C;

10) response to requests originating outside of the service VPS 304A-C, such that to an external user or requester, the process of generating the response is transparent in the sense that it appears that the target process (e.g., VPS 202A-C) is the actual respondent (see FIGS. 4 and 6, discussed below);

11) response to requests for multiplexing of a service, such that the response is processed either sequentially or simultaneously by the VPSs 202A-C. To an external user, it appears as if the service being requested is performed by a VPS to which the user is connected.

Figure 4B:
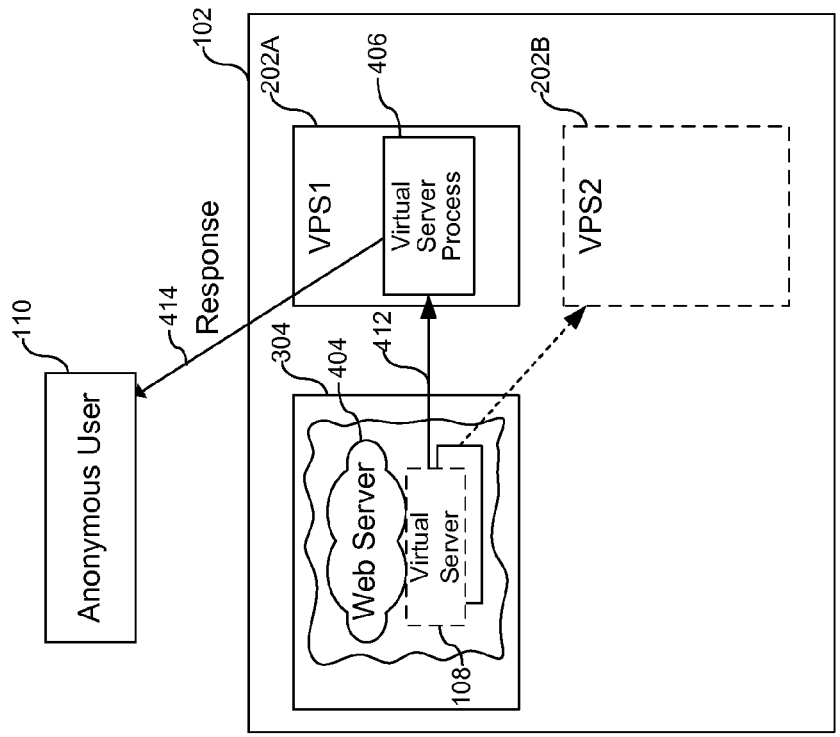
FIGS. 4A and 4B illustrate the process of handling a request from an anonymous user.
Figure 4A:
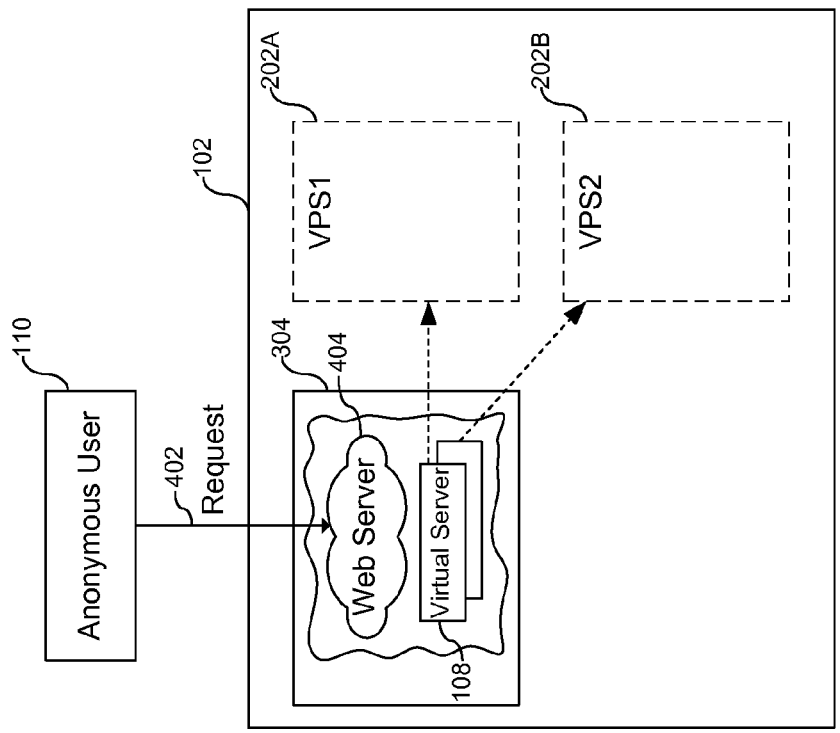

FIGS. 4A and 4B illustrate the process of receiving a request from an anonymous user 110. As shown in FIG. 4A, the anonymous user 110 sends a request 402 to the computer system 102, which is intercepted by the service VPS 304A. The service VPS 304A includes a number of virtual servers 108 and a webserver 104. The service VPS 304A determines a processing VPS and routes the request (see 412 in FIG. 4B) to an appropriate VPS (in this case, 202A). The VPS 202A then sends a response 414 back to the anonymous user.

Figure 5:
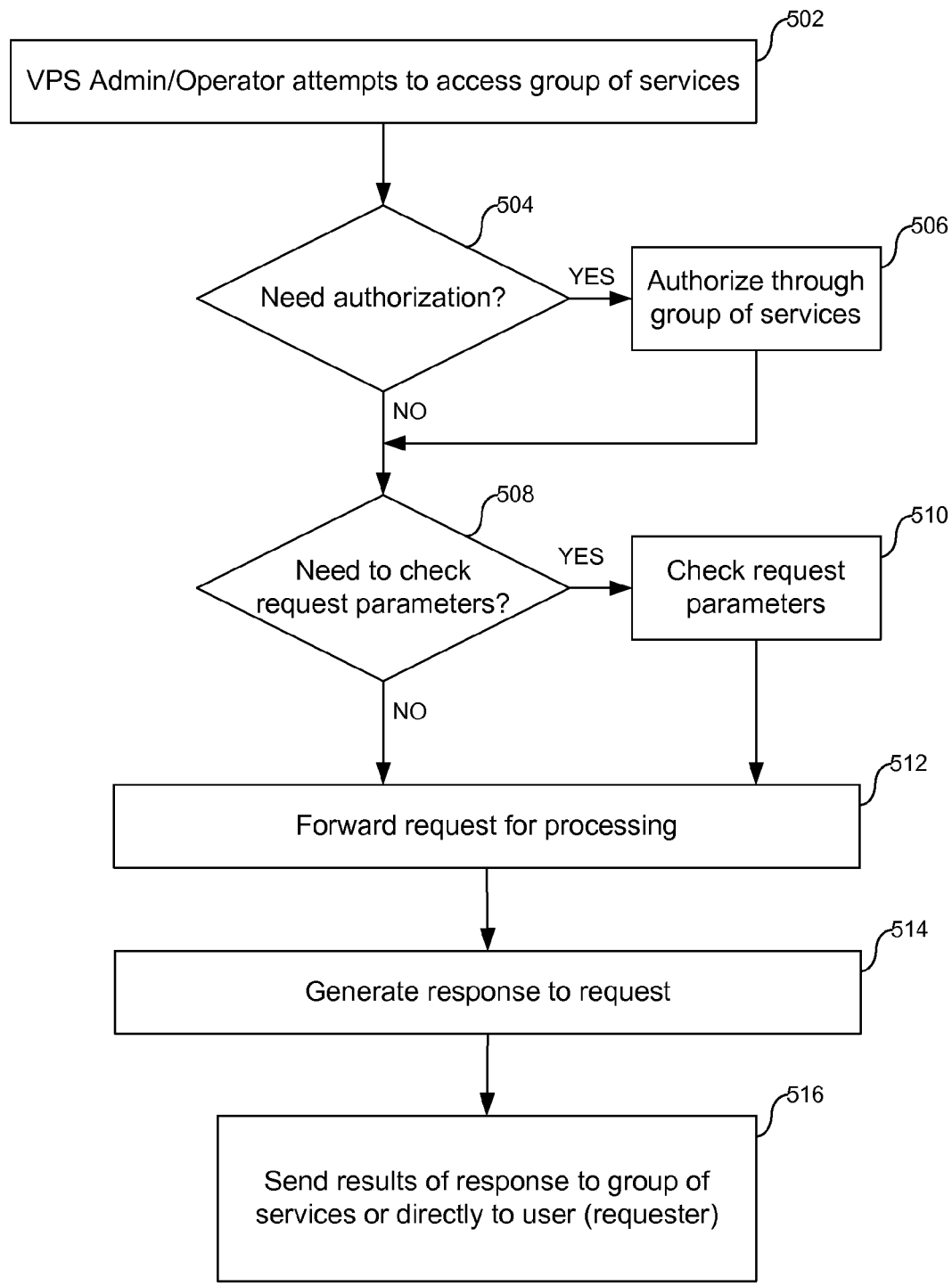
FIG. 5 illustrates the process of servicing a user request.

FIG. 5 illustrates the process of processing a request that requires intervention of the service VPS 304A. As shown in FIG. 5, a VPS administrator or a VPS operator attempts to access a VPS 202A-C in a manner that requires intervention from the service VPS 304A (step 502). If the request 402 needs authorization (step 504), the user is authorized through the service VPS 304A (step 506), and then proceeds to step 508, which determines whether there is a need to check parameters of the request. If no authorization is needed at step 504, then the process proceeds directly to step 508. At step 508, if there is a need to check request 402 parameters, the parameters are checked and verified (step 510). The process then executes the request 402 in a particular VPS 202A-C, for example, forwards it for processing, see 412 in FIG. 4 (step 512). If parameters of the request do not need to be checked, then the process proceeds directly from step 508 to step 512. After step 512, a response to the request is generated (step 514). The response is then forwarded to the requester (step 516).

Thus, the process of servicing a user request, which is illustrated in FIG. 5, is handled by the service VPS 304A, and typically includes a number of steps, such as:

1) receiving a request 402 by the service VPS 304A, where the request is typically received through a network or some other communications channel. The communications channel may include network connections and sockets, network protocols, inter-process communications used by the operating system, remote procedure calls, local procedure calls, and data exchange mechanisms (see 312A, 312B, 312C, etc., generically referred to as data exchange mechanism 312, 402, and 414 in FIGS. 3 and 4);

2) optional authorization;

3) optional verification of request 402 parameters by the service VPS 304A;

4) transferring the request 402 to the target process or environment (e.g., to the VPS 202A-C);

5) processing the request 402 at the target process or environment;

6) optional sending of the response 414 from the processor of the request to the requester;

7) optional sending of the response 414 to the user (requester) by the service VPS 304A.

A fact of life of data center operation, particularly operation of certain types of webservers, is that the vast majority of the time the servers are not actually doing anything. For example, in the case of webservers maintained by individuals, and which contain personal content (for example, family photos, etc.), the absolute majority of the time such a webserver is not actually responding to any requests, since there are no requests to respond to. However, such a webserver, which can include all the usual aspects of a webserver (in other words, the server itself, firewalls, file servers, etc.) still involves substantial overhead. For example, it may require 10 megabytes of actual, physical memory for each such web server. Clearly, this is a wasteful approach, and it would be preferable, in the case of such mostly inactive webservers, to only activate them when necessary. At the same time, the fact that the webserver is not actually "alive" most of the time should be transparent to the user.

In this case, the Virtual Private Servers (202A, 202B, etc.) need not actually exist, until a request 402 is received. Alternatively, if they exist, they can exist in a "minimal" form, that requires only very modest overhead. At the moment of receiving the request 402, the service VPS 304A determines where that request should be routed, activates the appropriate VPS, and forwards the request to that VPS. A virtual server process 406 can be launched within the VPS 202A to handle generating the response 414. The response 414 may be routed to the anonymous user directly, or may be routed to the anonymous user 110 back through the webserver 104 within the service VPS 304A. This mechanism allows a multiplexing of requests by anonymous users 110. The service VPS 304 can determine which VPSs 202A-C need to live "permanently," and which can be terminated and instantiated only upon receiving a request for service. Note that in FIG. 4, although the requester is shown as the anonymous user 110, the requester may also be an authorized user.

Figure 6:
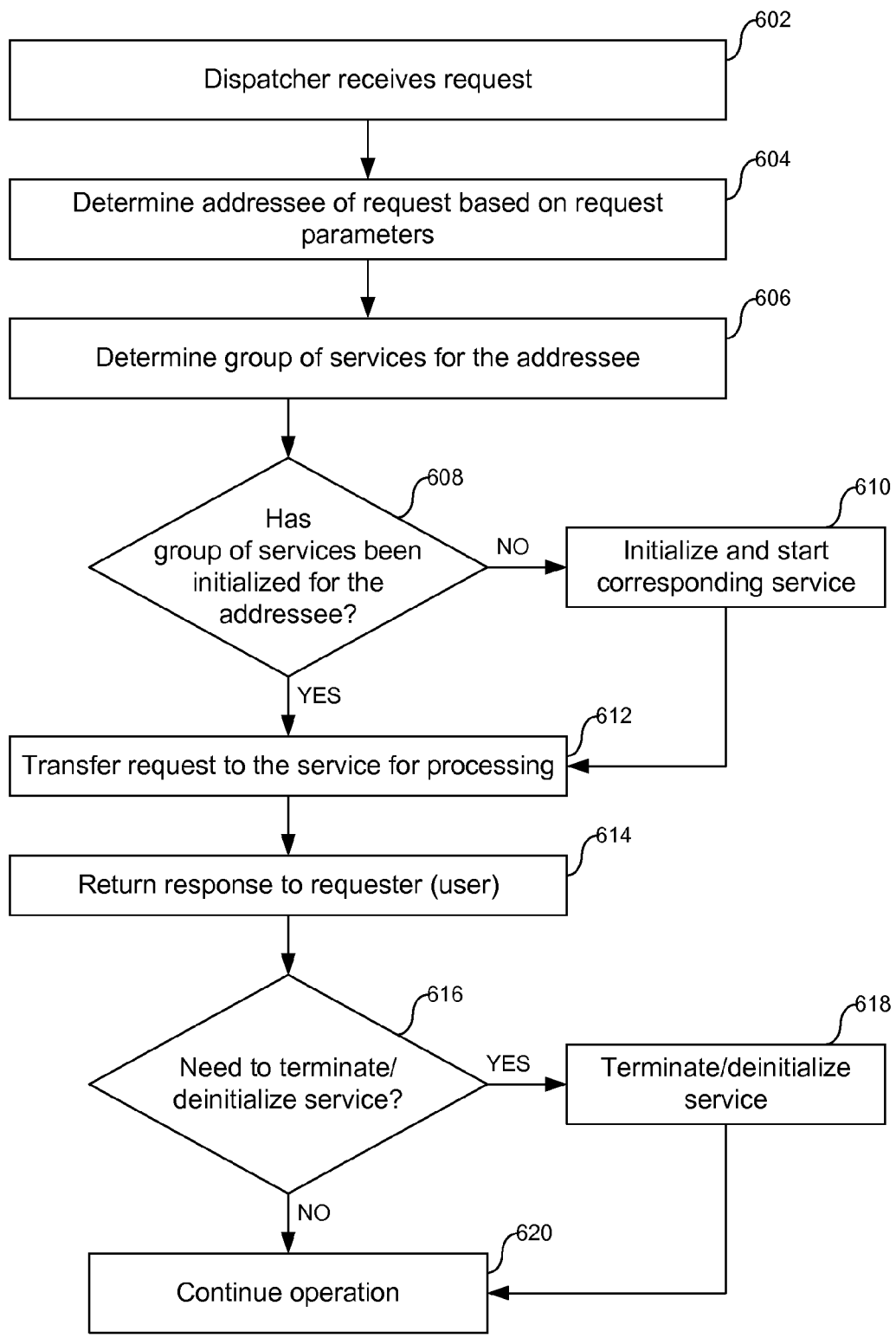
FIG. 6 illustrates the process of multiplexing of a particular service using the service VPS.

FIG. 6 illustrates the process of multiplexing server processes using the service VPS 304A. As shown in FIG. 6, a dispatcher receives a request for service 402 (step 602). An example of a dispatcher is an instance of a service VPS 304A, for example, one that is specifically dedicated to the function of intercepting such user requests. The addressee of the request 402 is determined, based on request parameters (step 604). The group of services (in other words, the VPS 202A-C that needs to perform the actual responding to the request 402) for that addressee is determined (step 606). The service VPS 304 then needs to determine whether the target group of services (e.g., a VPS 202A-C) has been initialized for that particular request 402 (step 608). If it has not been initialized, then it needs to be initialized and launched (step 610). The request 402 is then transferred to that VPS 202A-C for processing, see 412 in FIG. 4 (step 612). The response 414, once generated by the VPS 202A-C, is then returned to the requester (user or administrator) (step 614). If the started-up group of services or VPS 202A-C needs to be terminated or de-initialized (step 616) then that VPS 202A-C is terminated (step 618). Normal operation then continues (step 620).

The request for service that triggers multiplexing can be received using a network protocol, such as TCP/IP; or it may be received within a packet of data. In other words, the parameters of the request 402 could be determined based on packet metadata (e.g., the IP address to which this packet needs to be delivered), without "looking inside" the packet itself, or it may be based on the data within the packet.

The use of a dedicated VPS 304A for the purpose of administrative functions provides the advantage of having greater security for the process, and better control over the administration of the VPSs 202A-C, and their resources. Better security is usually due to possible isolation of VPSs from each other, and due to unification of configuration of the VPSs, and therefore standardization of administration operations, which simplifies support operations for user and administration services themselves.

Additionally, the overhead associated with this approach is lower than other approaches, which either use operating system calls, or embed these functions in each VPS 202A-C.

Figure 7:
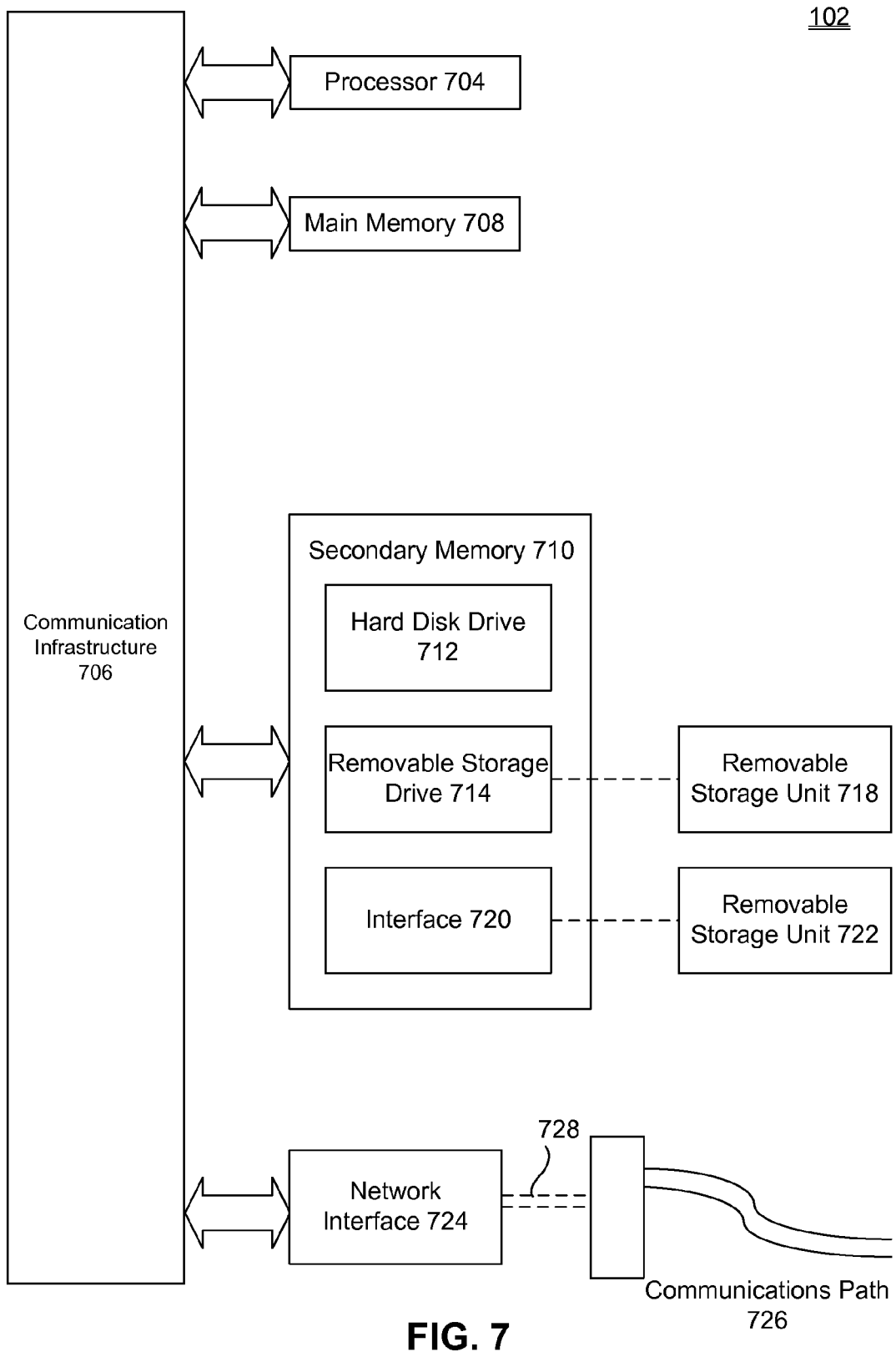
FIG. 7 illustrates an example of a computer architecture that may be used in the present invention.

An example of a computer system, or host, where the present invention may be used is illustrated in FIG. 7. The computer system 102 includes one or more processors, such as processor 704. The processor 704 is connected to a communication infrastructure 706, such as a bus or network). Various software implementations are described in terms of this exemplary computer system. After reading this description, it will become apparent to a person skilled in the relevant art how to implement the invention using other computer systems and/or computer architectures.

Computer system 102 also includes a main memory 708, preferably random access memory (RAM), and may also include a secondary memory 710. The secondary memory 710 can include, for example, a hard disk drive 712 and/or a removable storage drive 714, representing a magnetic tape drive, an optical disk drive, etc. The removable storage drive 714 reads from and/or writes to a removable storage unit 718 in a well-known manner. Removable storage unit 718 represents a magnetic tape, optical disk, or other storage medium that is read by and written to by removable storage drive 714. As will be appreciated, the removable storage unit 718 can include a computer usable storage medium having stored therein computer software and/or data.

In alternative implementations, secondary memory 710 can include other means for allowing computer programs or other instructions to be loaded into computer system 102. Such means can include, for example, a removable storage unit 722 and an interface 720. An example of such means can include a removable memory chip (such as an EPROM, or PROM) and associated socket, or other removable storage units 722 and interfaces 720 which allow software and data to be transferred from the removable storage unit 722 to computer system 102.

Computer system 102 can also include one or more communications interfaces, such as communications interface 724. Communications interface 724 allows software and data to be transferred between computer system 102 and external devices. Examples of communications interface 724 can include a modem, a network interface (such as an Ethernet card), a communications port, a PCMCIA slot and card, etc. Software and data transferred via communications interface 724 are in the form of signals 728 which can be electronic, electromagnetic, optical or other signals capable of being received by communications interface 724. These signals 728 are provided to communications interface 724 via a communications path (i.e., channel) 726. This channel 726 carries signals 728 and can be implemented using wire or cable, fiber optics, an RF link and other communications channels. In an embodiment of the invention, signals 728 comprise data packets sent to processor 704. Information representing processed packets can also be sent in the form of signals 728 from processor 704 through communications path 726.

The terms "computer program medium" and "computer usable medium" are used to generally refer to media such as removable storage units 718 and 722, a hard disk installed in hard disk drive 712, and signals 728, which provide software to the computer system 102.

Computer programs are stored in main memory 708 and/or secondary memory 710. Computer programs can also be received via communications interface 724. Such computer programs, when executed, enable the computer system 102 to implement the present invention as discussed herein. In particular, the computer programs, when executed, enable the processor 704 to implement the present invention. Where the invention is implemented using software, the software can be stored in a computer program product and loaded into computer system 102 using removable storage drive 714, hard drive 712 or communications interface 724.

Figure 8:
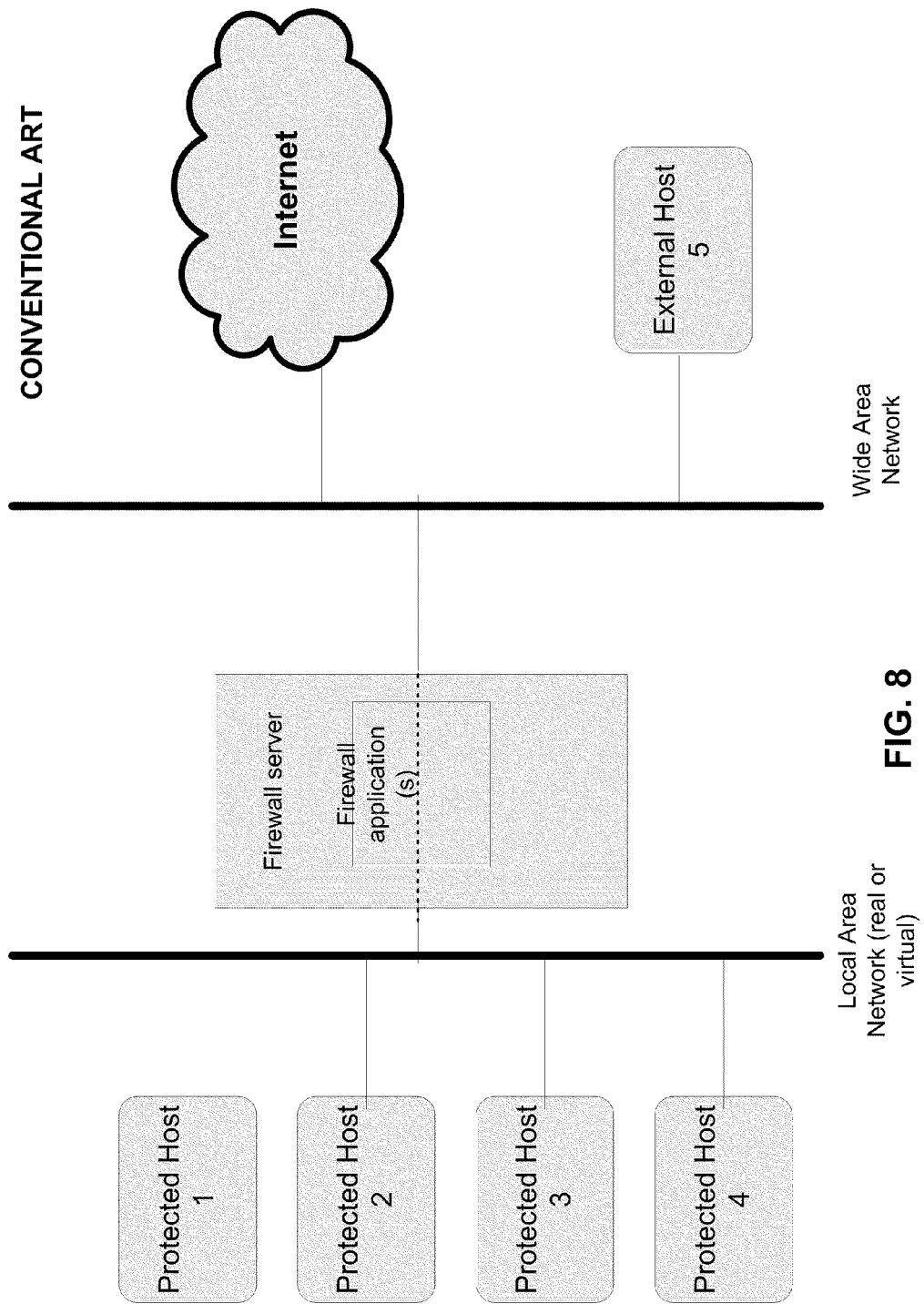
FIG. 8 illustrates a generic conventional security infrastructure with the firewall server located between LAN and Wide Area Network.

Another embodiment is focused on dedication of one or more VEEs for administration and management of security services for remote users. With respect to security services, FIG. 8 illustrates a generic conventional security infrastructure with a firewall server located between a LAN and a Wide Area Network. The firewall server executes firewall applications, which provide security services to LAN hosts located behind the firewall. The firewall rules and policies in this case are the same for all of the protected host servers, and only common security services are provided by the firewall server to all of the host servers.

Figure 9:
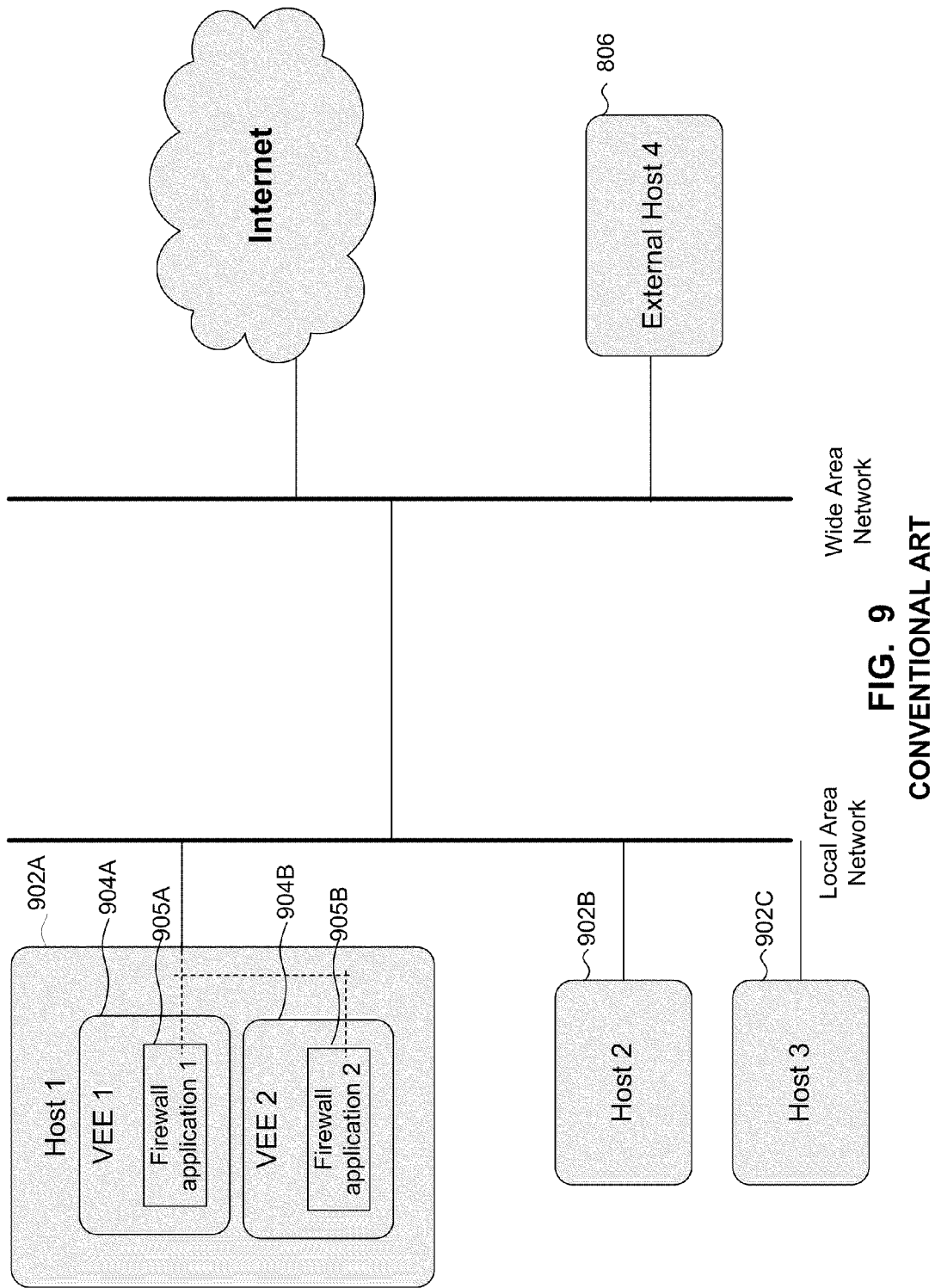
FIG. 9 illustrates a security infrastructure in the context of the Virtual Execution Environment (VEE) with the different firewall application being implemented within each of the VEEs.

There is an obvious need to provide security services based on specific needs of the individual host servers. The system for providing different firewall services to each of the host servers is illustrated in FIG. 9. Each of the host servers has an operating system 902A-902C. These operating systems 902 run the number of VEEs. For example, the operating system 902A of the host server runs two VEEs. The VEEs may be in a form of Virtual Machines (VMs) 904A and 904B respectively. VM 904A runs its own firewall application 905A and VM 904A also runs its own firewall application 905B. In this case, firewall applications 905A and 905B can have different security settings specific to VMs they protect. Thus VMs 904A and 904B are protected by their own firewall applications 905A and 905B from Internet and external servers 806. This security arrangement, while providing security advantages over the conventional firewall system depicted in FIG. 8, suffers from the significant operational overhead caused by the need to run a number of firewall applications on the same host server.

Figure 10:
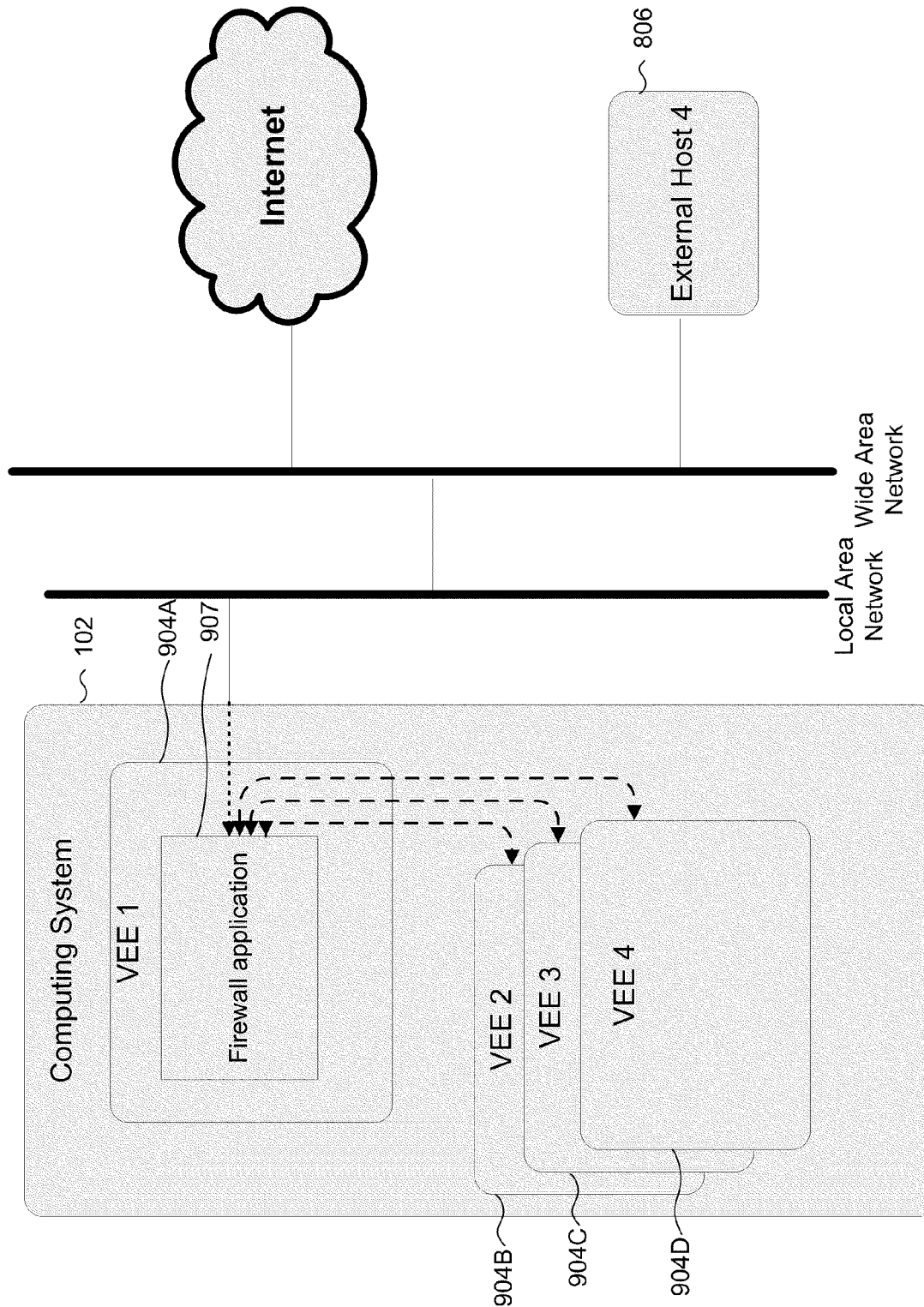
FIG. 10 illustrates how a designated VEE provides firewall functionality for several other VEEs.

This problem is solved by dedication of one or more VEEs to providing the firewall services to other VEEs, as illustrated in FIG. 10. The server 102 has, for example, four VEEs running on the physical machine. The VEEs in this example are the Virtual Machines 904A-904D, all of which require firewall services. The firewall application 907 runs only within dedicated VEE on the VM 904B and provides firewall services to other VMs and/or VEEs. The firewall application 907 provides firewall services to VMs 904B-904D according to the private security data set of each of the VMs. Thus VMs 904B-904D are protected by firewall application 907 from Internet and external servers 806.

Firewall services of this embodiment may include, but are not limited to intrusion detection, alarms, authentication based on user-specific parameters, authentication based on VEE-specific parameters, authentication based on a combination of the user-specific parameters and the VEE-specific parameters, and detection of denial-of-service attack.

Figure 11:
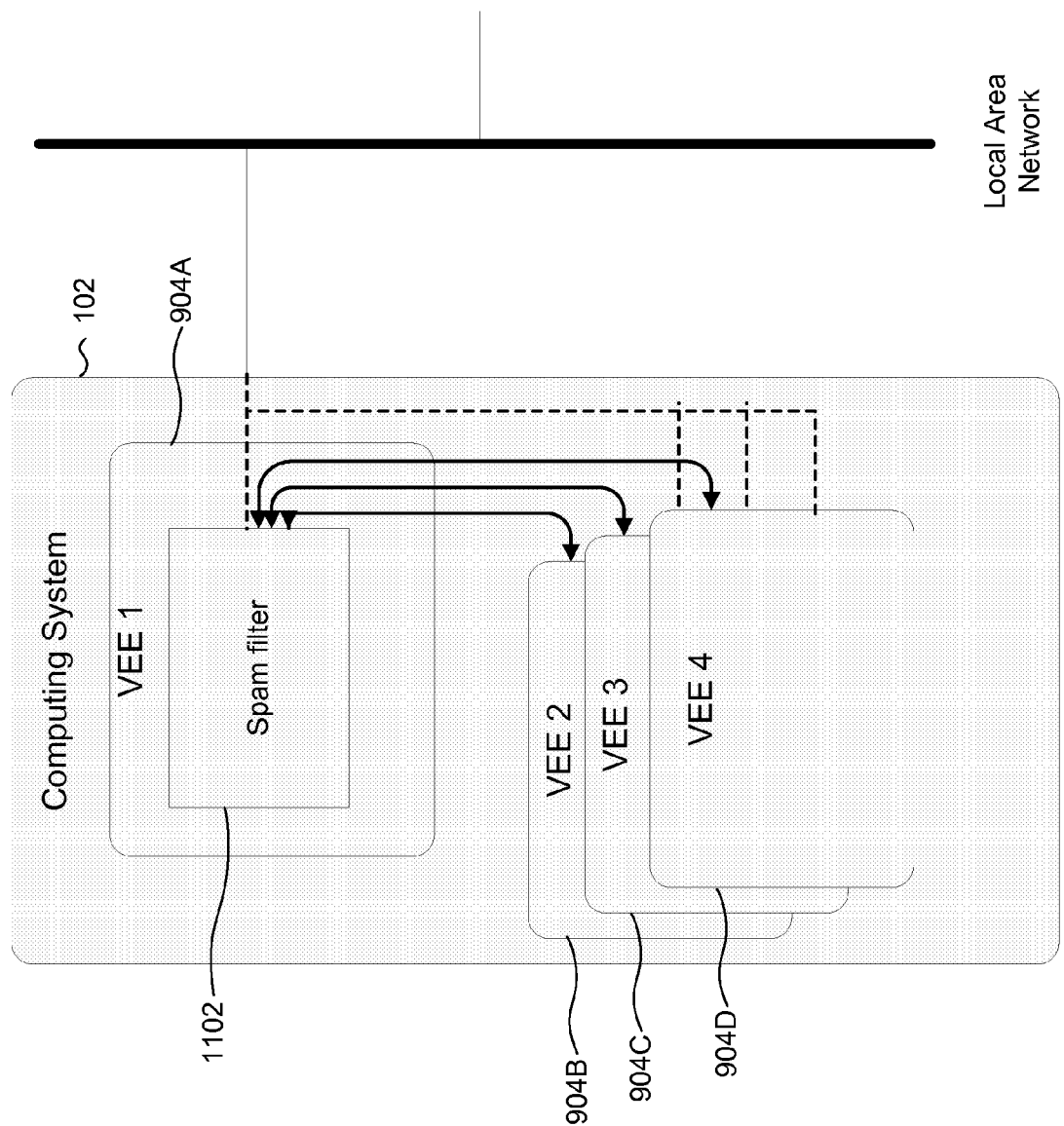
FIG. 11 illustrates how a designated VEE provides spam filtering functionality for several other VEEs.

The security services provided by the designated VEE are not limited to firewall services and can include spam filtering and anti-virus protection. FIG. 11 illustrates how a designated VEE provides spam filtering functionality for a plurality of other VEEs. Spam filtering services implementation is similar to the firewall implementation. In this example, the server 102 has four VEEs running on its operating system. The VEEs are the Virtual Machines 904A-904D, all of which require spam filtering services. The spam filter application 1102 runs only within dedicated VEE on the VM 904A and provides spam filtering services to other VMs 904B-904D running within respective VEEs. The spam filtering application 1102 provides spam filtering services to VMs 904B-904D according to the private security data set of each of the VMs. Having spam filtering application run on the dedicated VM 904A significantly reduces operational overhead and makes spam filtering application more stable.

Spam filtering services of this embodiment may include, but are not limited to, filtering content based on user-specific parameters only, filtering content based on VEE-specific parameters only, and filtering content based on a combination of the user-specific parameters and the VEE-specific parameters.

Figure 12:
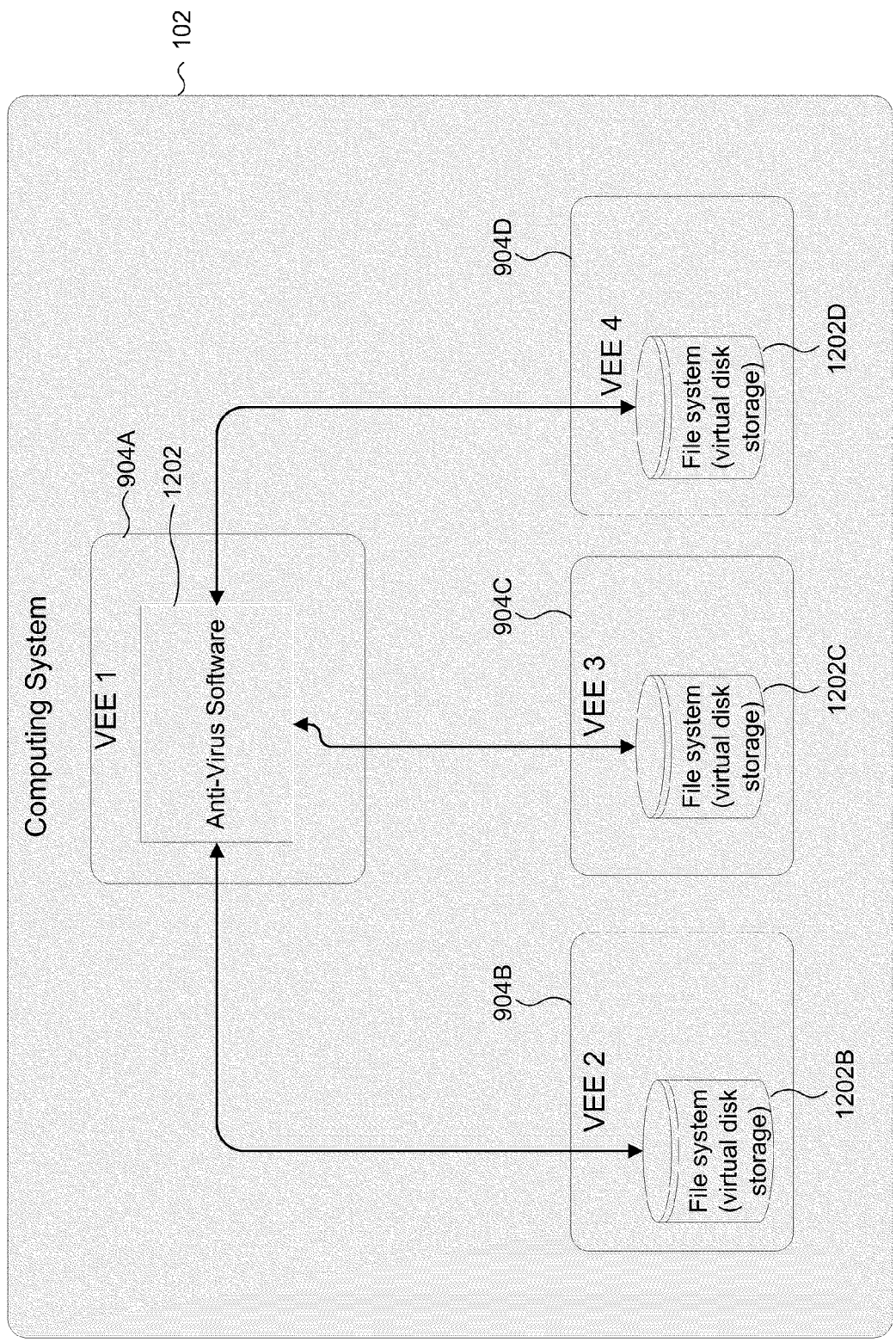
FIG. 12 illustrates how a designated VEE provides anti-virus protection for a plurality of other VEEs.

FIG. 12 illustrates how a designated VEE provides anti-virus protection for a plurality of other VEEs. Anti-virus application 1202 runs within the designated VEE on VM 904A and provides anti-virus protection to VMs 904B-904D. In this embodiment incoming traffic is not scanned by the anti-virus application like it is implemented with spam filtering depicted in FIG. 11. Anti-virus application 1202 has its own database with known virus data. Anti-virus application accesses the file systems 1202B-1202D of VMs 904B-904D and scans them for viruses. File systems 1202B-1202D can be virtual disc storages of respective VEEs or parts of a physical memory of the computer system 102. The anti-virus application 1202 provides anti-virus protection services to VMs 904B-904D according to the private security data set of each of the VMs. This security arrangement allows significant reduction of operational overhead by using only one database for executing the anti-virus application on different VMs.

Anti-virus protection services of this embodiment can include, but are not limited to, detection of known viruses based on matching a virus template from an individual VEE's file system; detection of viruses based on bit pattern analysis; detection of viruses based on recognition of decryption routines; detection of viruses based on file extensions; detection of viruses based on recognition of dummy loops, and detection of viruses based on hash values calculated from a potential virus code.

Figure 13:
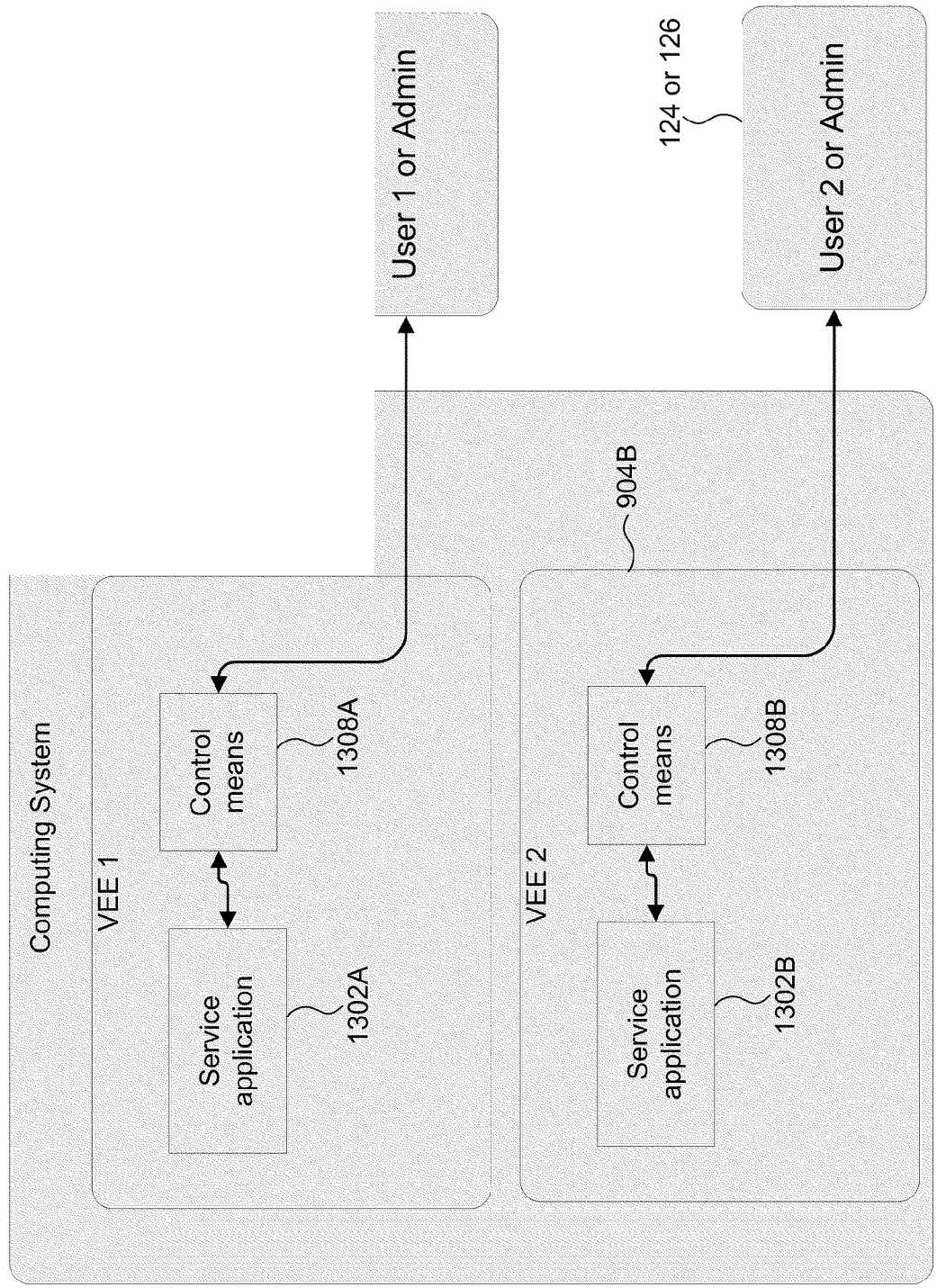
FIG. 13 illustrates a computing system infrastructure in the context of the Virtual Execution Environment (VEE) with the different service applications being implemented and controlled by each of the VEEs.

An example of an arrangement for control and administration of service applications in a Virtual Execution Environment is illustrated in FIG. 13. In this exemplary embodiment, two different VEEs run on the operating system 102. VMs 904A and 904B of the respective VEEs are controlled by users 124 and administered by administrators 126. The service applications 1302A and 1302B running on the VMs 904A and 904B are controlled by control means 1308A and 1308B respectively. Thus, each VM runs its own service application controlled by its own control means. While this VEE security infrastructure is functional and effective, it suffers from a significant operational overhead caused by necessity to run an instance of a service application coupled to control means on each of the Virtual Machines.

Figure 14:
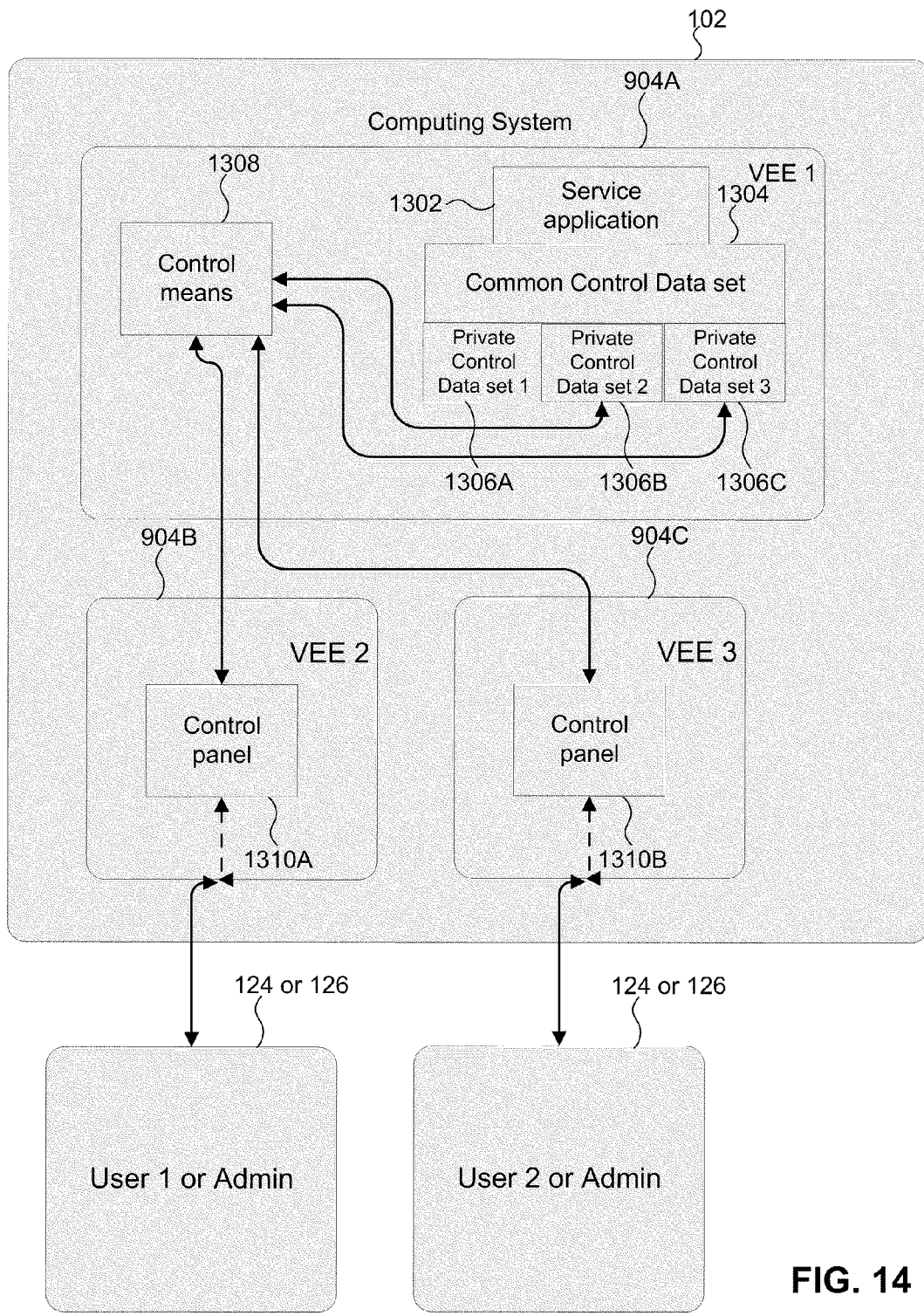
FIG. 14 illustrates an embodiment where a designated VEE runs the service application and provides services to several other VEEs.

The embodiment providing a more efficient and effective system for control and administration of service applications in a Virtual Execution Environment is illustrated in FIG. 14. Multiple VEEs run on the computer system 102. VM 904A is designated to provide security services to VMs 904B and 904C. Service application 1302 runs on VM 904A and is being controlled by control means 1308 residing on VM 904A. Each of the VMs 904B and 904C has its own control panel 1310A and 1310B, which are functionally coupled to the control means 1308 of VM 904A. This arrangement allows users 124 and administrators 126 of each of the VMs to control and administer the service application 1302 running on the dedicated VM 904A via the control panels 1310A and 1310B of the VMs 904B and 904C respectively. Thus, security service applications are provided to the remote users according to the specific security settings—private control data sets 1306A-1306C residing on the dedicated VM 904A. The operational overhead of control and administration process is significantly minimized by not only running one common instance of the security application on dedicated VM, but also by having common control data sets 1304 and private control data sets 1306A-1306C also reside on the dedicated VM 904A.

In alternative implementations, two or more dedicated VEEs running on different computer systems can provide services to other VEEs running on multiple computer systems arranged in a cluster. The dedicated VEEs act as real servers and provide services to the other VEEs acting as real clients. For example, the dedicated server-type VEE can intercept or filter a flow of IP packets and check the content of these packets for malicious code or unwanted data. The security services are run with the support of the dedicated server-type VEEs as if they were local services for the client-type VEEs. For example, all the client-type VEEs have their own administrative/security functions and security settings, but the applications that perform these functions run in the dedicated server-type VEEs. The users and administrators of the client-type VEEs can control and administer services provided by the dedicated server-type VEEs via the control panels of the client-type VEEs.

Having thus described the different embodiments of a system and method, it should be apparent to those skilled in the art that certain advantages of the described method and apparatus have been achieved. In particular, it should be appreciated by those skilled in the art that the security management system described in one of the embodiments significantly reduces operational overhead and associated costs, while increases the overall security and stability of the computers systems.

It should also be appreciated that various modifications, adaptations, and alternative embodiments thereof may be made within the scope and spirit of the present invention. The invention is further defined by the following claims.

What is claimed is:

1. A system for managing administration of security services comprising:
   a computer system having a processor and a memory;
   an operating system running on the processor and using the memory;
   a plurality of Virtual Execution Environments (VEEs) running under the operating system of the computer system, wherein the VEEs have private control data sets reflecting security settings of VEE remote users and provide services to a plurality of the remote users;
   at least one designated VEE operationally coupled to other VEEs of the plurality of the VEEs, wherein the designated VEE uses the private control data sets of each of the VEEs to provide security services to other VEEs; and
   control means within each designated VEE operationally coupled to control panels of the other VEEs for providing administration of the security services to each of the other VEEs.

2. The system of claim 1, wherein each VEE is any of a Virtual Private Server, a Virtual Machine, a Hypervisor-based Virtual Machine, and a Lightweight Hypervisor-based Virtual Machine.

3. The system of claim 1, wherein each designated VEE provides security services to a plurality of VEEs running on a cluster of computer systems.

4. The system of claim 1, wherein the security services include firewall services.

5. The system of claim 4, wherein the firewall services include any of:
   intrusion detection;
   alarms;
   authentication based on user-specific parameters;
   authentication based on VEE-specific parameters;
   authentication based on a combination of the user-specific parameters and the VEE-specific parameters; and
   detection of denial-of-service attack.

6. The system of claim 1, wherein the security services include spam filtering.

7. The system of claim 6, wherein the spam filtering includes any of:
   filtering content based on user-specific parameters only;
   filtering content based on VEE-specific parameters only; and
   filtering content based on a combination of the user-specific parameters and the VEE-specific parameters.

8. The system of claim 1, wherein the security services include anti-virus protection.

9. The system of claim 8, wherein anti-virus protection includes any of:
   detection of known viruses based on matching a virus template from an individual VEE's file system;
   detection of viruses based on bit pattern analysis;
   detection of viruses based on recognition of decryption routines;
   detection of viruses based on file extensions;
   detection of viruses based on recognition of dummy loops; and
   detection of viruses based on hash values calculated from a potential virus code.

10. The system of claim 1, wherein the control panels provide selection of the security services based on the private control data sets of each VEE; and wherein the private control data sets comprise rules and policies specific to each remote user of each VEE.

11. A method for managing administration of security services comprising:
- launching a plurality of Virtual Execution Environments (VEEs) on a computer system;
- designating at least one of the plurality of the VEEs for providing security services to other VEEs of the plurality of the VEEs;
- controlling deployment of the security services by each designated VEE, wherein each designated VEE is operationally coupled to each of the other VEEs using private control data sets specific to each of the other VEEs,
- wherein the private control data sets reflect security settings of VEE users; and
- using control means within each designated VEE operationally coupled to control panels of the other VEEs for providing administration of the security services to each of the other VEEs.

12. The method of claim 11, wherein each designated VEE provides security services to the plurality of VEEs running on a plurality of computer systems.

13. The method of claim 11, wherein the security services include firewall services.

14. The method of claim 13, wherein the firewall services include any of:
- intrusion detection;
- alarms;
- authentication based on user-specific parameters;
- authentication based on VEE-specific parameters;
- authentication based on a combination of the user-specific parameters and the VEE-specific parameters; and
- detection of denial-of-service attack.

15. The method of claim 11, wherein the security services include spam filtering.

16. The method of claim 15, wherein the spam filtering includes any of:
- filtering content based on user-specific parameters only;
- filtering content based on VEE-specific parameters only; and
- filtering content based on a combination of the user-specific parameters and the VEE-specific parameters.

17. The method of claim 11, wherein the security services include anti-virus protection.

18. The method of claim 17, wherein anti-virus protection includes any of:
- detection of known viruses based on matching a virus template from an individual VEE's file system;
- detection of viruses based on bit pattern analysis;
- detection of viruses based on recognition of decryption routines;
- detection of viruses based on file extensions;
- detection of viruses based on recognition of dummy loop; and
- detection of viruses based on hash values calculated from a potential virus code.

19. The method of claim 11, wherein the private control data sets comprise rules and policies specific to each remote user of the VEEs.

20. A non-transitory computer useable medium having computer program logic stored thereon for executing on a processor for managing administration of security services, the computer program logic comprising:
- computer program code means for launching a plurality of Virtual Execution Environments (VEEs) on a computer system;
- computer program code means for designating at least one of the plurality of the VEEs for providing security services to other VEEs of the plurality of the VEEs;
- computer program code means for controlling deployment of the security services in each designated VEE, each designated VEE being operationally coupled to each of the plurality of VEEs using private control data sets specific to each VEE; and
- computer program code means for using control means within each designated VEE operationally coupled to control panels of the other VEEs for providing administration of the security services to each of the other VEEs.

* * * * *